(12) United States Patent
Mizutani et al.

(10) Patent No.: US 6,798,757 B2
(45) Date of Patent: Sep. 28, 2004

(54) ESTABLISHING A ROUTE WITH A LEVEL OF QUALITY OF SERVICE IN A MOBILE NETWORK

(75) Inventors: Mika Mizutani, Cupertino, CA (US); Shigeru Miyake, Sunnyvale, CA (US)

(73) Assignee: Hitachi, Ltd., Tokyo (JP)

( * ) Notice: Subject to any disclaimer, the term of this patent is extended or adjusted under 35 U.S.C. 154(b) by 805 days.

(21) Appl. No.: 09/759,115

(22) Filed: Jan. 11, 2001

(65) Prior Publication Data

US 2002/0126633 A1 Sep. 12, 2002

(51) Int. Cl.[7] .............................................. H04L 12/56
(52) U.S. Cl. ........................ 370/329; 370/352; 370/401
(58) Field of Search ................................ 370/329, 352, 370/360, 395.32, 395.52, 401; 375/134; 455/463; 359/124

(56) References Cited

U.S. PATENT DOCUMENTS

| | | | | |
|---|---|---|---|---|
| 5,414,731 A | * | 5/1995 | Antunes et al. ............. | 375/134 |
| 5,809,011 A | * | 9/1998 | Almay ................... | 370/395.32 |
| 5,974,036 A | | 10/1999 | Acharya et al. ............ | 370/331 |
| 6,104,929 A | | 8/2000 | José et al. .................. | 455/445 |
| 6,192,250 B1 | * | 2/2001 | Buskens et al. ............ | 455/463 |
| 6,529,515 B1 | * | 3/2003 | Raz et al. ................... | 370/401 |
| 6,628,649 B1 | * | 9/2003 | Raj et al. .................... | 370/360 |
| 6,678,274 B1 | * | 1/2004 | Walia et al. ........... | 370/395.52 |
| 6,724,801 B1 | * | 4/2004 | Sylvain ...................... | 370/352 |
| 2002/0097463 A1 | * | 7/2002 | Saunders et al. ........... | 359/124 |

OTHER PUBLICATIONS

Durham, et al: RFC 2748, "The COPS (Common Open Policy Service) Protocol" *Network Working Group*, Category: Standards Track; Jan., 2000, pp. 1–34.

Blake, et al: RFC 2475, "An Architecture for Differentiated Services" *Network Working Group*, Category: Informational; Dec., 1998, pp. 1–32.

Handley & Jacobson: RFC 2327, "SDP: Session Description Protocol" *Network Working Group*, Category: Standards Track; Apr., 1998, pp. 1–37.

Nichols, et al: RFC 2474, "Definition of the Differentiated Services Field (DS Field) in the IPv4 and IPv6 Headers" *Network Working Group*, Category: Standards Track; Dec., 1998, pp. 1–18.

Solomon: RFC 2005, "Applicability Statement for IP Mobility Support" *Network Working Group*, Category: Standards Track; Oct., 1996, pp. 1–5.

Handley, et al.: RFC 2543, "SIP: Session Initiation Protocol" *Network Working Group*, Category: Standards Track; Mar., 1999, pp. 1–134.

(List continued on next page.)

*Primary Examiner*—Salvatore Cangialosi
(74) *Attorney, Agent, or Firm*—Squire, Sanders & Dempsey, L.L.P.

(57) ABSTRACT

A session for a mobile station is established by finding a route and determining the availability of resources on the route. Thereafter, active per-hop behaviors (PHB's) are distributed to ports along the route while inactive PHB's are distributed to ports near the route. The active and inactive PHB's provide information on how to route, transport, and process packets belonging to a session. In one embodiment, each of the PHB's indicates a priority level, forwarding port number, rules for discarding packets, rules for sending packets, etc. The packets are transported from one port to another in accordance with the active PHB's, thereby guaranteeing a level of quality of service (QoS). When the mobile station moves to a new location and changes the route, inactive PHB's are activated on the new route. This not only allows mobile stations to communicate at a certain level of QoS even after a move, but also minimizes the delay resulting from the move.

20 Claims, 18 Drawing Sheets

OTHER PUBLICATIONS

Awduche, et al.: RFC 2702, "Requirements for Traffic Engineering Over MPLS" *Network Working Group*, Category: Informational; Sep., 1999, pp. 1–26.

Rosen, Viswanathan & Callon: Internet Draft, draft–ietf–mpls–arch–07.txt "Multiprotocol Label Switching Architecture" *Network Working Group*, Jul., 2000, pp. 1–56.

Johnson and Perkins: Internet Draft, draft–ietf–mobileip–ipv6–12.txt "Mobility Support in IPv6" *Network Working Group*, Apr., 2000, pp. 1–103.

Callon, et al.: IETF Draft, draft–ietf–mpls–framework–05.txt "A Framework for Multiprotocol Label Switching" *Network Working Group*, Sep., 1999, pp. 1–64.

C. Perkins: RFC 2002, "IP Mobility Support" *Network Working Group*, Category: Standards Track; Oct., 1996, pp. 1–70.

Braden, Ed., et al.: RFC 2205, "Resource ReSerVation Protocol (RSVP)" *Network Working Group*, Category: Standards Track; Sep., 1997, pp. 1–99.

* cited by examiner

Session ID: 9865432l123
Source Home IP address: {Home IP Address of MS 41}
Destination Home IP address: {Home IP Address of MS 42}
Direction: sendrecv
Distributing information for send:
  Edge IP Router 31A: (Behavior ID = 1, Label information list = port 1, QoS state = port 2, Status = Active)
         (Behavior ID = 1, Label information list = port 3, QoS state = port 2, Status = Inactive)

IP Router 32B:  (Behavior ID = 3, Label information list = port 1, QoS state = port 2, Status = Active)
         (Behavior ID = 3, Label information list = port 2, QoS state = port 2, Status = Inactive)

Edge IP Router 31B: (Behavior ID = 8, Label information list = port 1, QoS state = port 3, Status = Active)
         (Behavior ID = 7, Label information list = port 2, QoS state = port 1, Status = Inactive)

Distributing information for recv:
  Edge IP Router 31A: (Behavior ID = 4, Label information list = port 2, QoS state = port 1, Status = Active)
         (Behavior ID = 4, Label information list = *, QoS state = port 3, Status = Inactive)

IP Router 32B:  (Behavior ID = 5, Label information list = port 2, QoS state = port 1, Status = Active)
         (Behavior ID = 5, Label information list = *  , QoS state = port 2, Status = Inactive)

Edge IP Router 31B: (Behavior ID = 9, Label information list = port 3, QoS state = port 1, Status = Active)
         (Behavior ID = 10, Label information list = port 1, QoS state = port 2, Status = Inactive)

Per-hop Behavior:
    Behavior ID=1: Forwarding port no = 2,
          input label = Null,
          output label = 5,
          class of service = 3,
          Priority level = 3,
          Discarding rule = 6 (maximum queuing number)
          Sending rule = Null
    Behavior ID=3: Forwarding port no = 2,
          input label = 5,
          output label = 7,
          class of service = 3,
          Priority level = 3,
          Discarding rule = 6 (maximum queuing number)
          Sending rule = Null

FIG. 9A

(CONTINUED FROM FIG. 9A)

Behavior ID=4: Forwarding port no = 1,
  input label = 10,
  output label = 10,
  class of service = 3,
  Priority level = 3,
  Discarding rule = 6 (maximum queuing number)
  Sending rule = Null Behavior ID=5: Forwarding port no = 1,
  input label = 2,
  output label = 10,
  class of service = 3,
  Priority level = 3,
  Discarding rule = 6 (maximum queuing number)
  Sending rule = Null Behavior ID=7: Forwarding port no = 1,
  input label = Null,
  output label = 5,
  class of service = 3,
  Priority level = 3,
  Discarding rule = 6 (maximum queuing number)
  Sending rule = Null Behavior ID=8: Forwarding port no = 3,
  input label = 7,
  output label = 7,
  class of service = 3,
  Priority level = 3,
  Discarding rule = 6 (maximum queuing number)
  Sending rule = Null Behavior ID=9: Forwarding port no = 1,
  input label = Null,
  output label = 2,
  class of service = 3,
  Priority level = 3,
  Discarding rule = 6 (maximum queuing number)
  Sending rule = Null Behavior ID=10: Forwarding port no = 2,
  input label = 10,
  output label = 4,
  class of service = 3,
  Priority level = 3,
  Discarding rule = 6 (maximum queuing number)
  Sending rule = Null

FIG. 9B

ESTABLISHING A ROUTE WITH A LEVEL OF QUALITY OF SERVICE IN A MOBILE NETWORK

BACKGROUND OF THE INVENTION

1. Field of the Invention

This invention relates generally to communications networks, and more particularly to methods and associated systems for establishing a session in a mobile network.

2. Description of the Background Art

Mobile systems such as cellular phones and wireless data communications devices allow a user to communicate with other users or access remote computers from any location within a roaming zone. The freedom and convenience afforded by mobile systems have made them very popular.

The growth of the Internet has created a demand for mobile systems that can provide e-mail and Internet connectivity in addition to telephone service. This is to be expected as the Internet is rich with information and allows access to a wide variety of on-line services. Unfortunately, data communications on the Internet is conducted using the Internet Protocol (IP), which transports packets on a best-effort basis. That is, the IP protocol does not have mechanisms for guaranteeing a certain level of quality of service (QoS), such as delay, throughput, jitter, etc. This creates a problem because some sessions require a higher level of QoS than others. For example, a multimedia session ordinarily requires a higher bandwidth and lower delay than a web browsing session. Despite this limitation of IP, mobile networks continue to migrate towards IP-based architectures not just to provide Internet connectivity, but also to take advantage of IP routers which cost lower than traditional mobile switches. In an IP-based mobile network, a mobile station is coupled to a base station controller, which in turn is attached to a node of an IP network.

Protocols such as the Resource Reservation Setup Protocol (RSVP) and Multiprotocol Label Switching (MPLS) have been developed to guarantee a certain level of QoS in an IP network. RSVP defines a convention for transferring QoS requirements to nodes within the IP network. Using RSVP, resources along a traffic route can be allocated for a particular session. Thereafter, MPLS methods, which make use of path-forwarding and QoS information, may be employed to transport the session's packets along the traffic route. The application is thus guaranteed a level of QoS as long as the traffic route does not change, which is usually the case with fixed IP networks.

Because mobile stations can move from one location to another, mobile networks present a set of problems not ordinarily encountered in fixed IP networks. For example, when an originating mobile station initiates a video telephone session to a terminating mobile station, resources along a route between the originating and terminating mobile stations are allocated using RSVP to guarantee the session a level of QoS. However, moving the originating (or terminating) mobile station to another location changes part of the route, resulting in new nodes along the new route. Because resources have not been allocated for the video telephone session on the new nodes, QoS can no longer be guaranteed. Further, the movement of the originating mobile station changes the total traffic on the nodes along the new and old routes, making it difficult to keep track of the overall traffic and resource usage on the IP network. Unfortunately, existing conventions for routing packets in a mobile IP network, such as Mobile IP, do not adequately address the aforementioned problems.

SUMMARY

The present invention relates to a method and associated system for establishing a session with a level of quality of service (QoS) in a mobile network. In one embodiment, a session for a mobile station is established by finding a route and determining the availability of resources on the route. Thereafter, active per-hop behaviors (PHB's) are distributed to ports along the route. Additionally, inactive PHB's are distributed to ports near the route. The active and inactive PHB's provide information on how to route, transport, and process packets belonging to the session. In one embodiment, each of the PHB's indicates a priority level, forwarding port number, rules for discarding packets, rules for sending packets, etc. The packets are transported from one port to another in accordance with the active PHB's, thereby guaranteeing a level of QoS. When the mobile station moves to a new location and changes the route, inactive PHB's are activated on the new route. This not only allows mobile stations to communicate at a certain level of QoS even after a move, but also minimizes the delay resulting from the move.

These and other features and advantages of the present invention will be readily apparent to persons of ordinary skill in the art upon reading the entirety of this disclosure, which includes the accompanying drawings and claims.

BRIEF DESCRIPTION OF THE DRAWINGS

FIGS. 9A and 9B show an example distributing information in accordance with an embodiment of the present invention.

The use of the same reference labels in different drawings indicates the same or like components.

DETAILED DESCRIPTION

Figure 1:
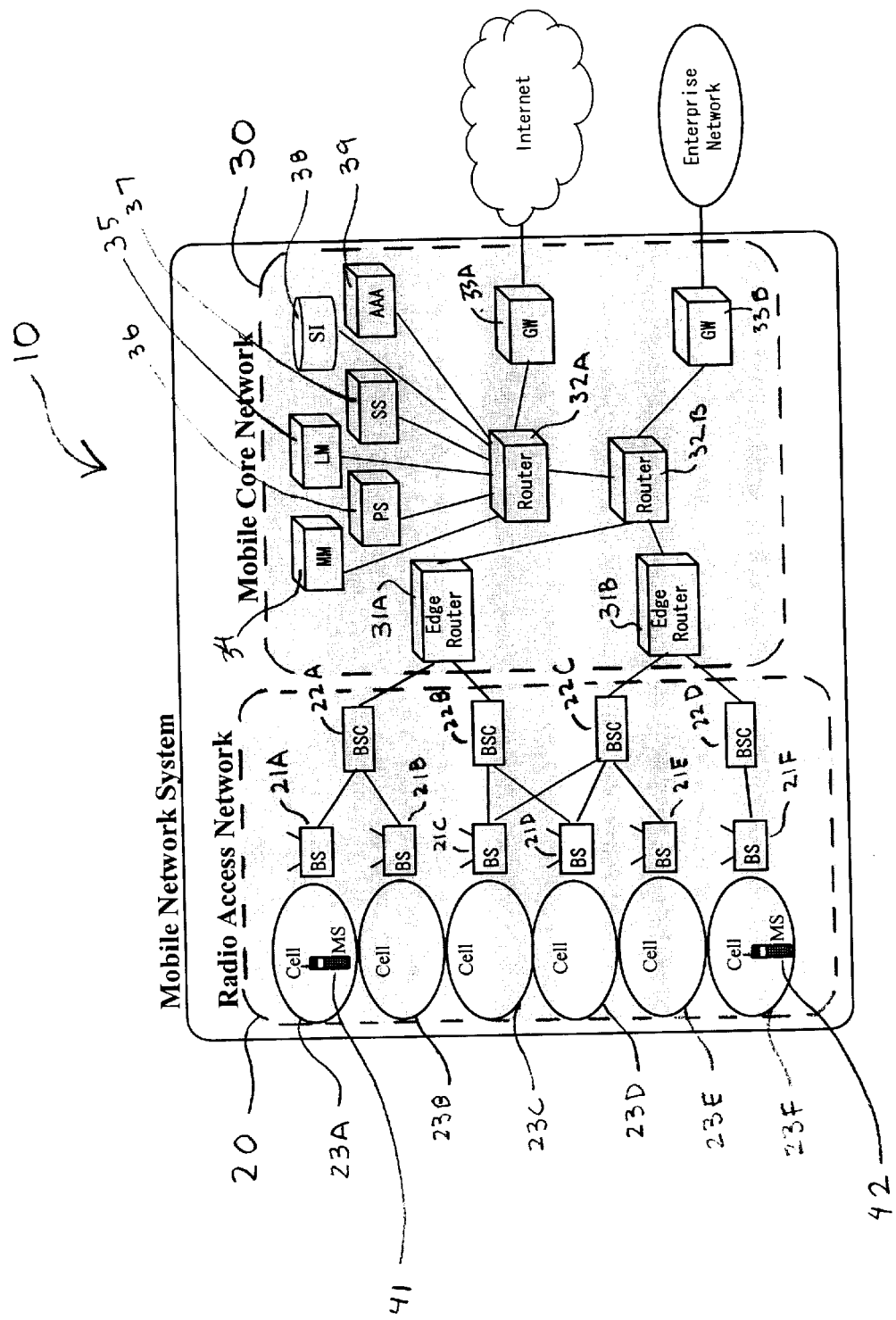
FIG. 1 shows a schematic diagram of a mobile network in accordance with an embodiment of the present invention.

Turning now to FIG. 1, there is shown a schematic diagram of a mobile network 10 in accordance with an embodiment of the present invention. Mobile network 10 includes a radio access network 20 and an IP-based mobile core network 30. Radio access network 20 further includes multiple base stations for providing wireless communications links to mobile stations within service areas referred to as cells. As used in this disclosure, the term "mobile station" includes cellular phones, personal digital assistants, personal computers, and other devices that are ordinarily used in more than one location. In mobile network 10, cells 23A–23F are serviced by base stations 21A–21F, respectively. Each base station is assigned to a base station controller, which couples radio access network 20 to mobile core network 30. For example, when a mobile station 41 is in cell 23A, data from mobile station 41 reach mobile core network 30 via base station 21A and base station controller 22A. As shown in FIG. 1, each base station controller may support multiple base stations.

The node which couples a mobile station to an IP network is known as an attachment point. In mobile core network 30, routers 31A and 31B serve as attachment points for mobile stations in cells 23A–23F. Routers 31 are also referred to as "edge routers" because they are located on the perimeter of mobile core network 30. Router 32B couples edge routers 31A and 31B to other nodes of mobile core network 30, including gateways 33A and 33B and other routers such as router 32A. Gateways 33 provide connectivity to other networks such as the Internet or an enterprise network. In this disclosure, the term "router" refers to interior routers (e.g., routers 32) and/or edge routers (e.g., routers 31) unless otherwise specified.

Figure 2:
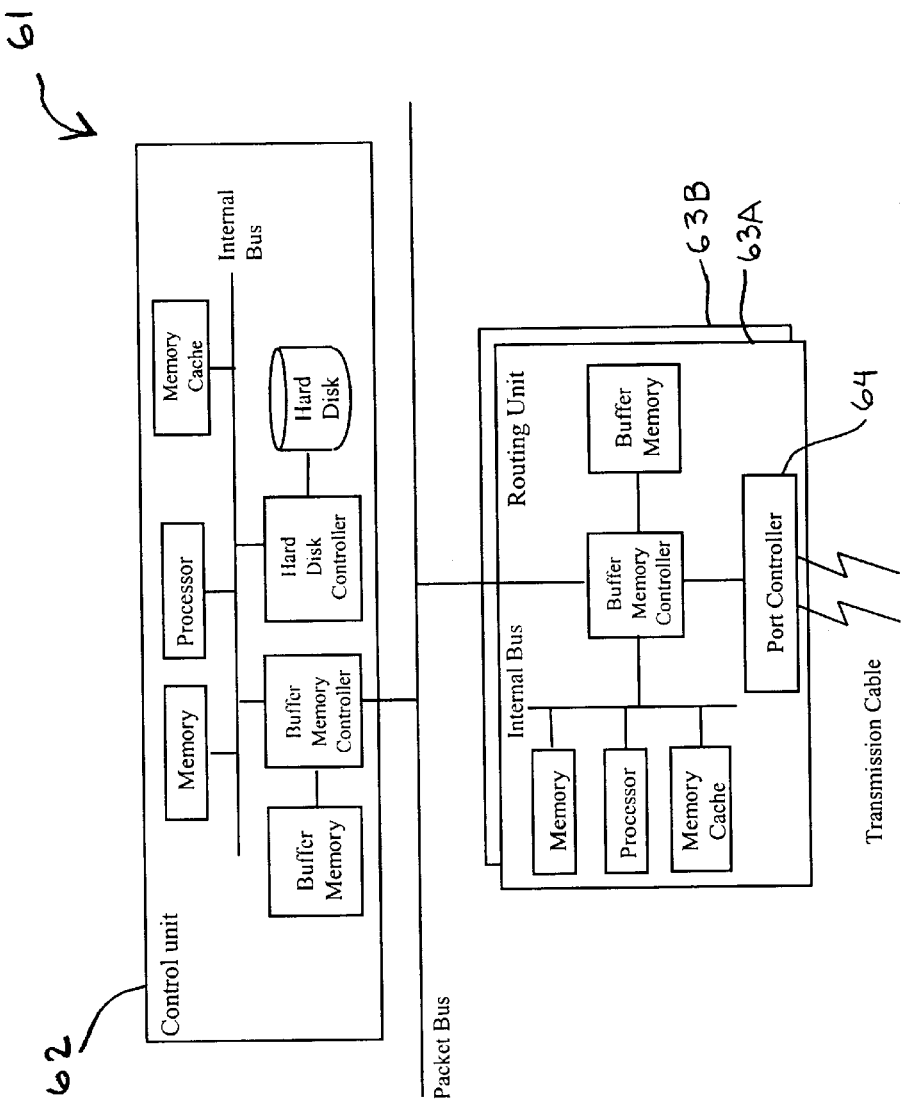
FIG. 2 shows a schematic diagram of a router.

FIG. 2 shows a schematic diagram of a router 61 that is suitable for use in mobile core network 30 as an edge router 31 or a interior router 32. Router 61 includes multiple ports 63 (ports 63A, 63B, etc.) and a control unit 62 for routing packets from one port 63 to another. Each port 63 has an input interface for receiving packets and an output interface for sending packets. A port controller 64 couples router 61 to another node in mobile core network 30 or a base station controller in radio access network 20. Any commercially available IP router that supports Multiprotocol Label Switching (MPLS) may also be used without impacting the efficacy of the present invention.

Referring back to FIG. 1, mobile core network 30 further includes the following hosts coupled to interior router 32A: mobility manager 34, location manager 35, policy server 36, session server 37, subscriber information database 38, and authentication, authorization, and accounting (AAA) server 39. It is to be understood that the actual topology of mobile core network 30, including the interconnection, number, and types of nodes used may be varied without detracting from the merits of the present invention. For example, the functionality provided by various hosts may be implemented in a single host or separately in multiple hosts. As another example, the hosts may be coupled to separate routers that are reachable from mobile core network 30.

Mobility manager 34 keeps track of the movement of mobile stations. Mobility manager 34 receives information regarding the movement of a mobile station and accordingly updates the mobile station's location information, which is stored and managed by location manager 35. Mobility manager 34 also functions as a home agent for mobile stations that move outside mobile core network 30. As is commonly known, a home agent forwards packets for a mobile station that is away from its home location.

Session server 37 functions as a Session Initiation Protocol (SIP) proxy server for establishing, maintaining, and releasing sessions (e.g., multimedia session) in mobile network 10. SIP, in general, is well known and described in the Internet Engineering Task Force (IETF) document entitled "SIP: Session Initiation Protocol," RFC 2543 (Internet URL:<www.ietf.org>).

AAA server 39 provides for authentication, authorization, and accounting. When a session setup authorization is requested, AAA server 39 queries subscriber information database 38 for information regarding the requester to ensure that the requester is a current subscriber and is authorized to make use of network services. AAA server 39 also queries policy server 36 to determine if the requested session conforms to a set of rules commonly known as network policy. If the requester is verified as a current subscriber and the requested session complies with network policy, AAA server 39 authorizes the creation of the session. Additionally, AAA server 39 keeps track of the subscriber's network usage for billing purposes.

Figure 3:
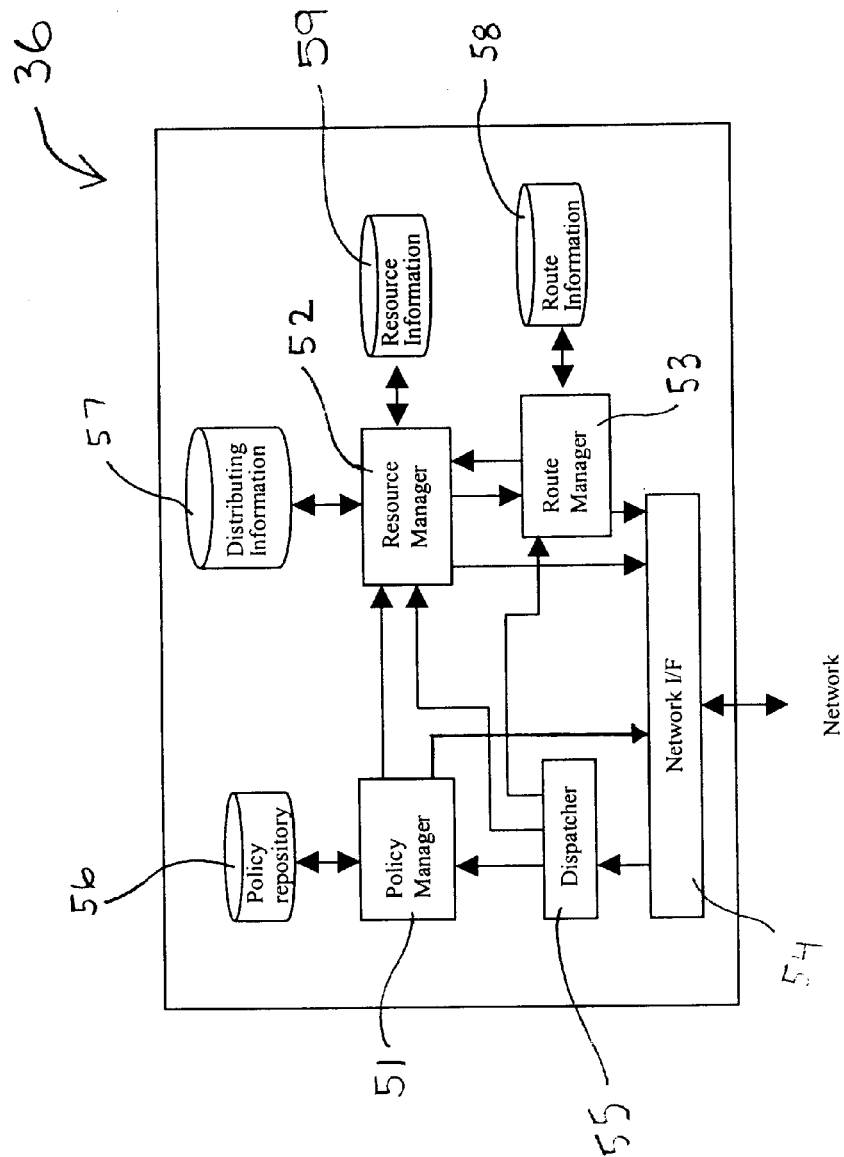
FIG. 3 shows a schematic diagram of a policy server in accordance with an embodiment of the present invention.

Policy server 36 is now described with reference to the schematic diagram of FIG. 3. Policy server 36 includes a network interface 54 for receiving packets from mobile core network 30. Data from the received packets are forwarded by a dispatcher 55 to policy manager 51, resource manager 52, and/or route manager 53 for processing. Policy manager 51 administers the policies of mobile core network 30, which are stored in a policy repository database 56. Generally speaking, network policies are administrative permissions that define what subscribers can and cannot do on the network. Table 1 shows exemplary policy rules stored in policy repository database 56.

TABLE 1

EXAMPLE POLICY RULES

```
Rule 1:                                    /*Rule for Audio*/
if ((source = Hanako) and (time = week-end or time = evening)
    and (media = audio))
then
    priority = 3 (of 8);
    priority assignment = sendrecv;
else if ((source = Hanako) and (media = audio))
then
    priority = 6 (of 8);
    priority assignment = sendrecv;
Rule 2:                                    /*Rule for Video*/
if((source = Hanako) and (time = week-end or time = evening)
    and (media = video))
then
    priority = 4 (of 8);
    priority assignment = sendrecv;
else if ((source = Hanako) and (media = video))
    priority = 7 (of 8);
    priority assignment = sendrecv;
Rule 3:                              /*Default Rule For Hanako*/
if (source = Hanako)
then
    priority = 8 (of 8);              /* best effort */
priority assignment = sendrecv;
```

As indicated in Rule 1 of Table 1, a subscriber named Hanako has a sending and receiving priority level of 3 for audio sessions conducted on weekends or during the evenings (off-peak time periods). Otherwise, Hanako's audio sessions get a priority level of 6. That is, Hanako's audio sessions are given priority of service over other sessions that have a priority level lower than 3 during off-peak time periods. Similarly, Hanako's video sessions are given a sending and receiving priority level of 4 during off-peak time periods and a priority level of 7 at any other time (Table 1, Rule 2). For other types of sessions, Hanako is not guaranteed a level of QoS and is thus given a priority level of 8 (Table 1, Rule 3). From the foregoing, it is evident that policy manager 51 allows policy server 36 to restrict the kind of actions that may be performed in mobile core network 30, thereby affording some control over network traffic and resource usage. For example, a video session having a priority of level of 4 cannot be created for Hanako on weekday mornings. A request to setup such a video session will accordingly receive a "resource assignment failure" reply from policy server 36.

Route manager 53 provides route information between two locations in mobile network 10, such as between two mobile stations or between a mobile station and a node. To find a route between two mobile stations, the home IP addresses of the mobile stations, the care—of addresses of the mobile stations, and the IP addresses of the edge routers coupled to the two mobile stations are provided to route manager 53. Route manager 53 then finds a route based on route information stored in a route information database 58, which reflects the topology of the mobile network. Table 2 shows an example route information stored in route information database 58.

TABLE 2

EXAMPLE ROUTE INFORMATION

From Edge Router 31A
    if (Destination = Edge Router 31B)
        then {
            out = (port 2 of Edge Router 31A);
            in = (port 1 of Router 32B);
            out = (Port 2 of Router 32B);
            in = (Port 1 of Edge Router 31B);
        };
    else if ((Destination IP address) and (mask
    address) = Subnetwork address)
        then{
            out = (port 2 of Edge Router 31A);
            in = (port 1 of Router 32B);
            out = (port 3 of Router 32B);
            in = (port 1 of GW 33B);
        };
    else{
            out = (port 2 of Edge Router 31A);
            in = (port 1 of Router 32B);
            out = (port 3 of Router 32A);
            in = (port 1 of GW 33A);
        };

Resource usage in mobile core network 30 is administered by resource manager 52. A resource information database 59 provides resource manager 52 access to information about resource usage on the network. Table 3 shows an example resource information stored in resource information database 59.

TABLE 3

EXAMPLE RESOURCE INFORMATION

Node Name = Edge Router 31A
    Port Number = 1
        Total Bandwidth: In = 4 Mbps, Out = 4 Mbps
        Allocated Bandwidth:   In = 640 Kbps, Out = 1.2 Mbps
        Status Information: (time, usage rate In, Usage rate Out) =
                          (time 1, 25%, 33%)
                          (time 2,...) ...
    Port Number = 2
    .....
Node Name = Edge Router 31B
.....

As shown in the example of Table 3, port number 1 of edge router 31A has a bandwidth of 4 Mbps for incoming and outgoing traffic. Out of the total bandwidth on port number 1 of edge router 31A, 640 Kbps and 1.2 Mbps have already been allocated for incoming and outgoing traffic, respectively. Also shown in Table 3 is port usage during different time periods. In the example, 25% of the total incoming bandwidth and 33% of the total outgoing bandwidth are used during time period one. Resource information database 59 also contains resource information about other ports of edge router 31A, all ports of edge router 31B, all ports of router 32A, and so on.

Resource manager 52 also has access to a distributing information database 57, which contains information on how routing information (in the form of a per-hop behavior) is distributed in mobile core network 30. The contents of distributing information database 57 are further discussed later on with reference to FIGS. 9A and 9B.

Figure 4A:
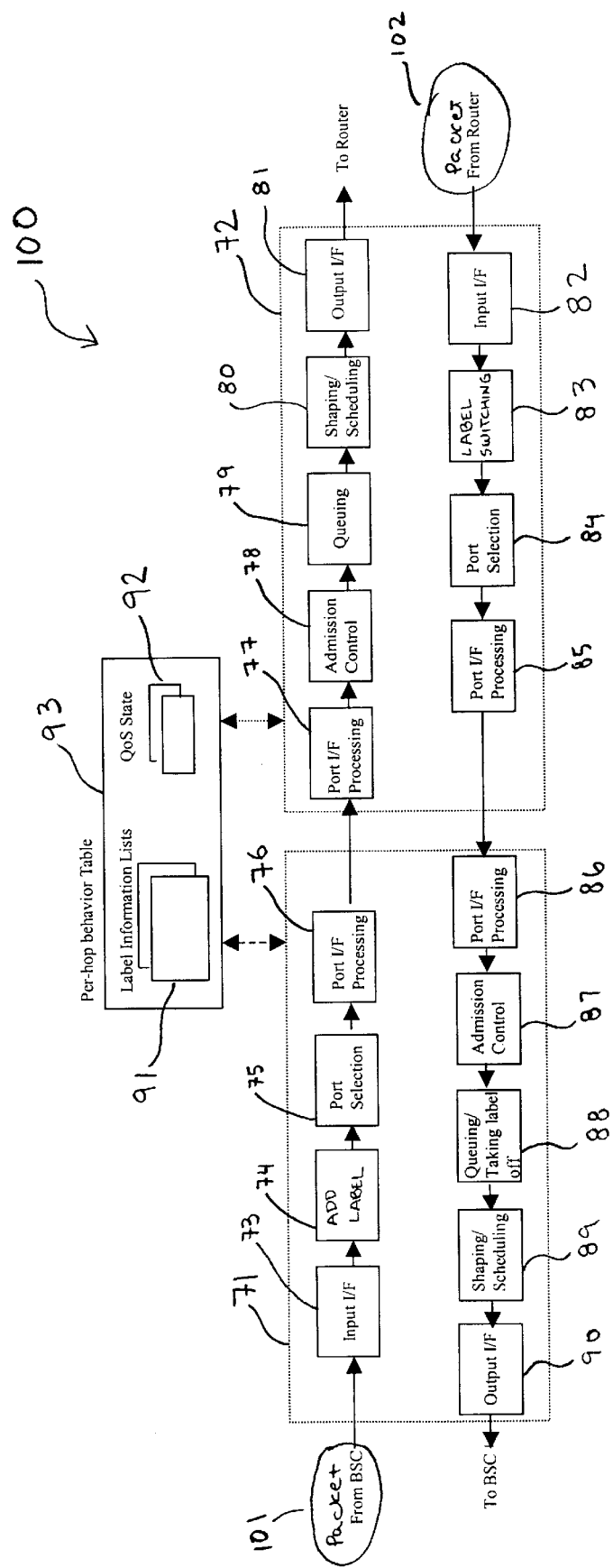
FIGS. 4A and 4B show flow diagrams illustrating the processing of packets in an edge router and interior router, respectively.

FIG. 4A shows a flow diagram 100 illustrating the processing of IP packets in an edge router 31 in one embodiment of the present invention. The steps generally enclosed by dotted line 71 are performed on a port of the edge router 31 that is coupled to a base station controller. The steps performed on a port of the edge router 31 that is coupled to an interior router such as routers 32A and 32B are generally enclosed by dotted line 72. Beginning with step 73, an input interface receives an IP packet 101 from a base station controller. A Multiprotocol Label Switching (MPLS) label is then added to packet 101 (step 74). The MPLS label identifies a corresponding label information list 91 stored in a per-hop behavior (PHB) table 93. Using forwarding information contained in the label information list 91, an output interface of a port in the edge router 31 is selected for packet 101 (step 75). Thereafter, packet 101 is forwarded to the selected output interface (steps 76 and 77). It is to be noted that MPLS labels are not added to received packets that do not have corresponding label information lists. To reach their destinations in mobile core network 30, these non-MPLS packets are forwarded using conventional IP routing mechanisms.

The output interface selected for packet 101 performs admission control, queuing, and shaping/scheduling on packet 101 in accordance with a corresponding quality of service (QoS) state list stored in PHB table 93. In the admission control step (step 78), the output interface manages the amount of traffic flowing through the router by, for example, discarding certain packets. The discarding rule is defined in the corresponding QoS state list of the packet. For example, the discarding rule may specify the maximum number of packets that can be queued; packets that exceed the maximum number are discarded.

In the queuing step (step 79), the output interface queues packets based on priority levels indicated in their respective QoS state lists. Packets with higher priority are given higher priority in the queue, thereby guaranteeing a certain level of QoS for certain types of sessions. For example, a multimedia session may be given a priority level of 1 (highest priority) to ensure that its packets are not discarded during the admission control step.

In the shaping/scheduling step (step 80), the output interface sends the packets stored in the queue by following a sending rule stored in the QoS state list. A sending rule specifies how a packet is to be sent. For example, the sending rule may indicate the minimum bandwidth to be used for sending the packet. After the shaping/scheduling step, packet 101 is then transmitted to an input interface of a port of the next router (i.e., the next hop) (step 81).

As shown in FIG. 4A, a packet 102 from another router (e.g., an interior or edge router) is received in an input interface of the edge router 31 (step 82). An existing MPLS label on packet 102 is then replaced with a new MPLS label which identifies a corresponding label information list 91

(step 83). Using forwarding information contained in its corresponding label information list 91, packet 102 is forwarded to an output interface of a port in the edge router 31 (steps 84, 85, and 86). The output interface then performs admission control (step 87), queuing (step 88), and shaping/scheduling (step 89) on packet 102. The added MPLS label is removed during the queuing step (step 87) before packet 102 is transmitted to a base station controller (step 90).

Figure 4B:
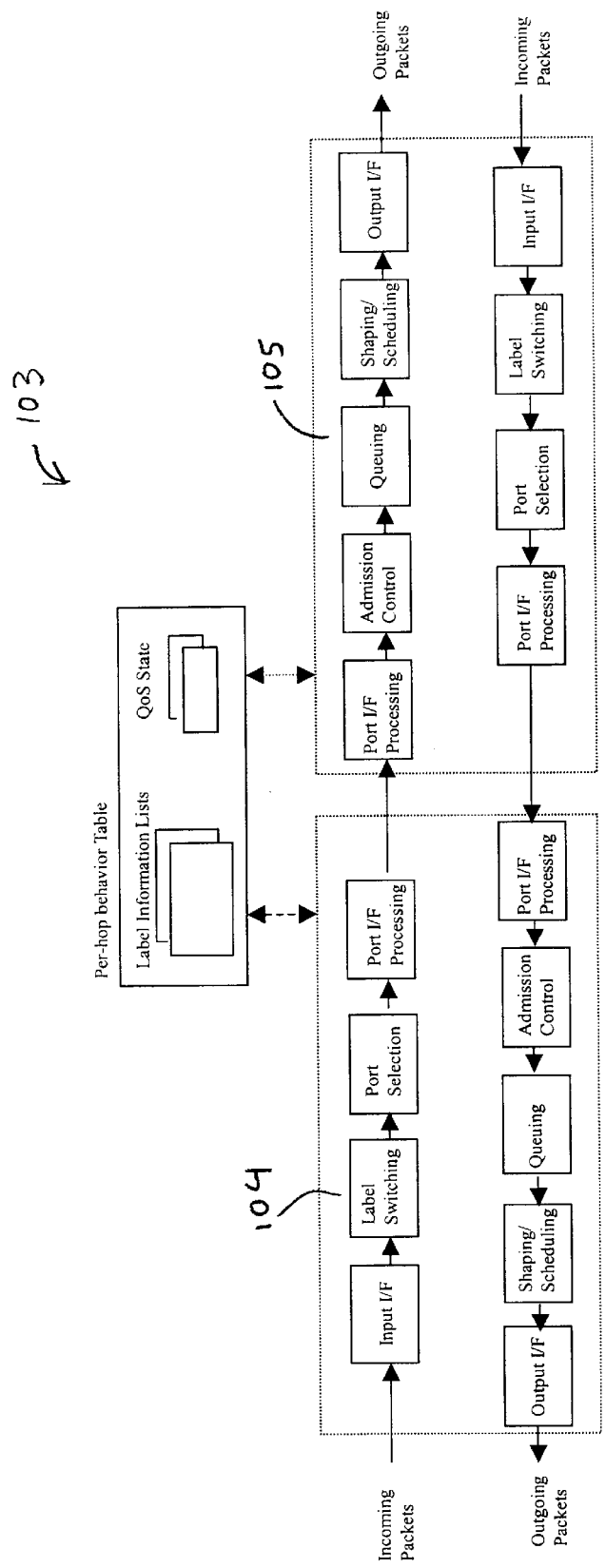

FIG. 4B shows a flow diagram 103 illustrating the processing of IP packets in an interior router 32. In interior router 32, steps to remove and add MPLS labels are not performed on packets directly received from or going to another router. For example, labeling step 104 in flow diagram 103 performs MPLS label switching, not adding, on packets received from another router. Also, queuing step 105 does not remove MPLS labels from packets going to another router. For packets directly received from or going to a host, MPLS labels are added during the labeling steps and removed during the queuing steps. Otherwise, flow diagrams 101 and 103 process packets in essentially the same way.

Figure 5:
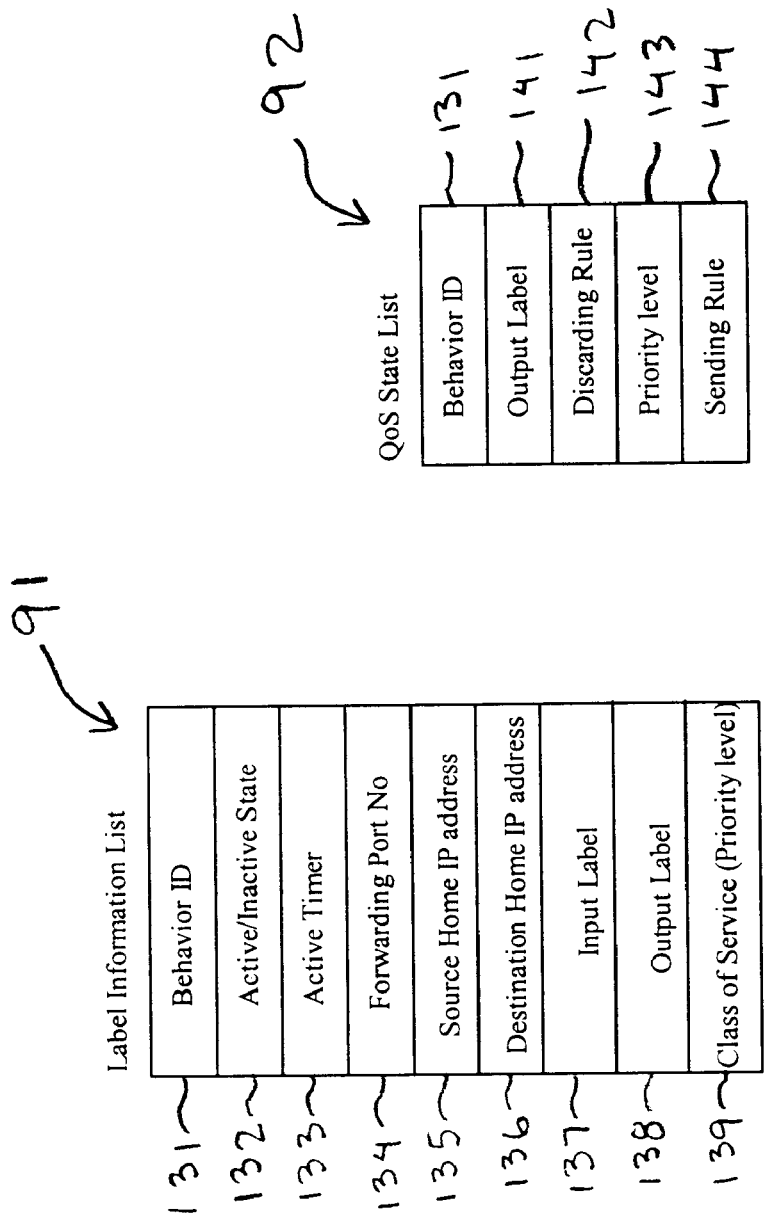
FIG. 5 shows a pictorial representation of a per-hop behavior in accordance with an embodiment of the present invention.

FIG. 5 shows a pictorial representation of the contents of a label information list 91 and a QoS state list 92 in accordance with an embodiment of the present invention. Collectively, label information list 91 and QoS state list 92 are referred to as a per-hop behavior (PHB). Generally speaking, a PHB provides information on how to route, transport, and process a packet. Referring to FIG. 5, a behavior ID field 131 in label information list 91 and QoS state list 92 identifies the PHB among several PHB's stored in a PHB table 93 (see FIGS. 4A and 4B). Label information list 91 also includes an active/inactive state field 132 for indicating whether the label information list is an active or inactive PHB. As will be discussed later on below, active PHB's are distributed to ports along a route whereas inactive PHBs are distributed to neighboring ports near the route.

An active timer field 133 functions as a countdown timer for determining whether the PHB is in use. The value in active timer field 133 is periodically decremented regardless of whether the PHB is accessed or not. Thus, active timer field 133 is restarted every time the label information list is accessed in order to keep the PHB alive. The session supported by the PHB is deemed over when active timer field 133 is decremented to zero, thereby initiating a session release procedure.

Incoming packets from a base station controller are matched to their corresponding label information lists using a source home IP address field 135 and destination home IP address field 136; that is the source and destination IP addresses indicated in a packet are compared to address fields 135 and 136 of label information list 91. Address fields 135 and 136 serve as the primary label information list locator for incoming packets received from a base station controller.

An input label field 137 and an output label field 138, which are shorter than IP addresses, are also provided to allow for fast look-up of corresponding label information lists. Thus, the MPLS label on each packet may be used as an index to get the corresponding label information list. For packets received from routers, label fields 137 and 138 serve to identify corresponding label information lists. Input MPLS label field 137 identifies a label information list for an incoming packet received on an input interface, whereas output MPLS label field 138 identifies a label information list for an outgoing packet to be forwarded to an output interface. During a label switching step, the label information list identified in input label field 137 is replaced by the label information list identified in output label field 138.

A class of service field 139 in label information list 91 indicates the priority level of the packet.

In addition to a behavior ID field 131, QoS state list 92 also includes an output label field 141 to allow for fast look-up of corresponding QoS state lists. The value of output label field 141 matches that of output label field 138 of label information list 91. A priority level field 143 indicates a priority level, while a discarding rule field 142 and sending rule field 144 identify the discarding and sending rules to be used in processing the packets.

Figure 6:
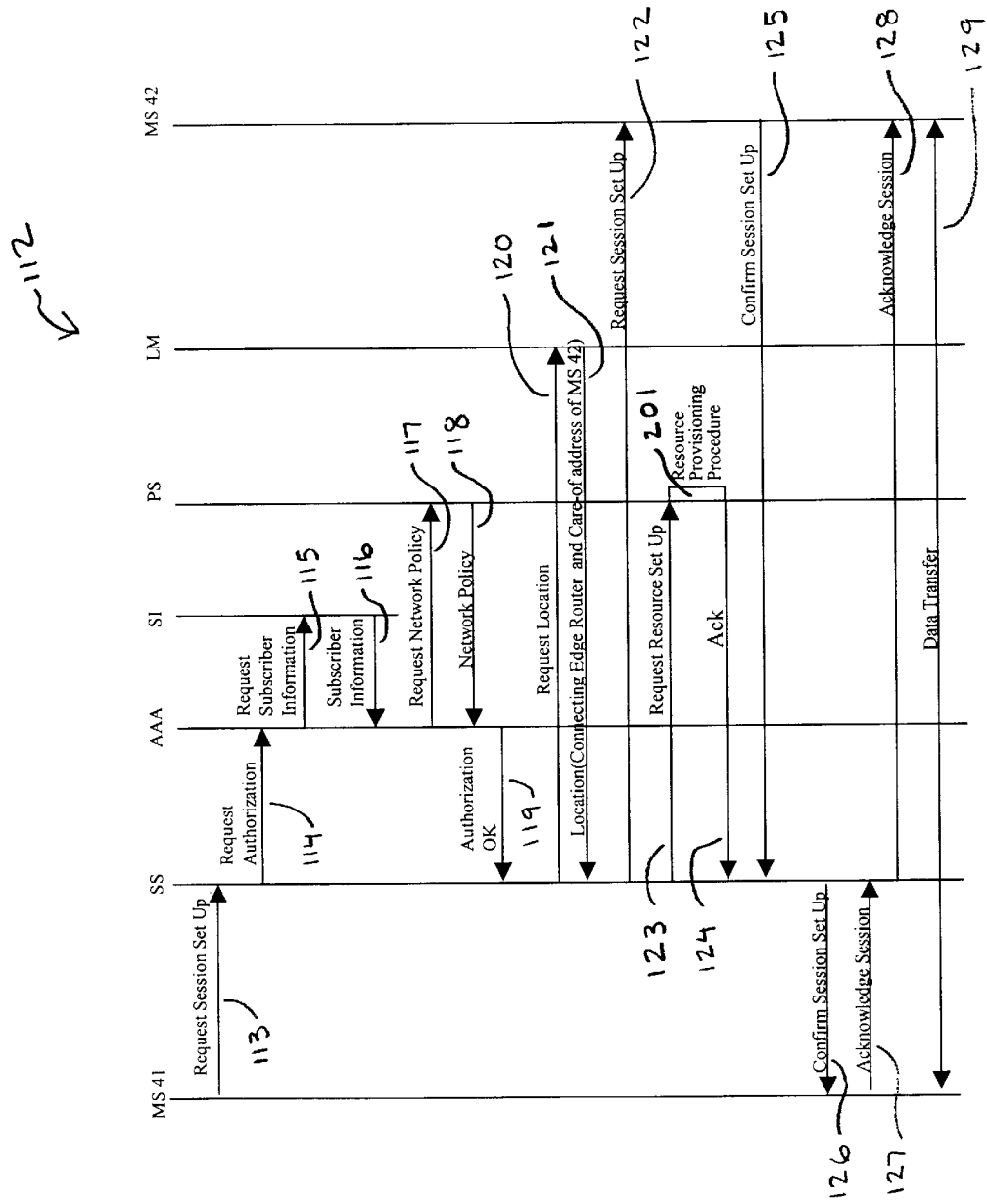
FIG. 6 shows a flow diagram for establishing a session in accordance with an embodiment of the present invention.

FIG. 6 shows a flow diagram 112 for establishing a session in accordance with an embodiment of the present invention. In the example of FIG. 6, a session between mobile stations 41 and 42 is established in mobile network 10 (see FIG. 1). The session is initiated when mobile station (MS) 41 submits a session setup request to session server (SS) 37 (step 113). An example message body of a session setup request is shown in Table 4.

TABLE 4

EXAMPLE MESSAGE BODY OF A SESSION SETUP REQUEST

INVITE (Session Setup Request)
Via: SIP/2.0/UDP SessionServer.hitachimobile.net   /*identifies the session server*/
From: Hanako @hitachimobile.net
To:   Ichiro @htiachimobile.net
Call-ID: 987654321123 @SessionServer.hitachimobile.net
Content-type: application/SDP
Content-length: x
Version = 0
Owner = Hanako
Time
Connection Info
media = audio, 333 (Port), RTP, 1 (media attribute)
media attribute
QoS attribute = Mandatory/Optional
QoS attribute = sendrecv/send/recv In the example of Table 4, the session server is requested to setup an audio session between users Hanako and Ichiro, whose respective home IP addresses in URL format are "hanako@hitachimobile.net" and "ichiro@hitachimobile.net". The audio session runs an application described in accordance with the Session Description Protocol (SDP). SDP, in general, is well known; e.g., see the IETF document entitled "SDP: Session Description Protocol," RFC 2327 (Internet URL:<www.ietf.org>). The session setup message body also indicates whether the QoS attributes (e.g., priority level) of the session are mandatory or optional, and whether the QoS attributes apply when sending packets, receiving packets, or both.

In response to the session setup request, session server 37 asks MA server 39 if the requested session is authorized (step 114, FIG. 6). AAA server 39 then queries subscriber information (SI) database 38 to determine if the requesting user is a current subscriber (steps 115 and 116). AAA server 39 also queries policy server (PS) 36 to determine if the session conforms to network policy (e.g., whether the requesting user has administrative permissions) (steps 117 and 118). If the user is a valid subscriber and is setting up a session that conforms to network policy, AAA server 39 authorizes the creation of the session (step 119).

In step 120, session server 37 asks location manager (LM) 35 for the location of MS 42. In response, location manager 35 provides the IP address of the edge router coupled to MS 42 and the care—of address of MS 42 (step 121). Thereafter, session server 37 sends a session setup request to MS 42 (step 122).

In step 123, session server 37 sends a resource setup request to policy server 36, where a resource provisioning procedure 201 (later discussed with reference to FIG. 7) is performed to allocate the resources needed to guarantee a level of QoS for the session. Once the resources for the requested session have been allocated, policy server 36 sends an acknowledgement to session server 37 (step 124).

When MS 42 is ready to communicate with MS 41, MS 42 sends a confirmation message to session server 37 (step 125), which then relays the confirmation message to MS 41 (step 126). In response, MS 41 sends an acknowledgement to MS 42 via session server 37 (steps 127 and 128). Thereafter, data transfer occurs between MS 41 and MS 42 (step 129).

Figure 7:
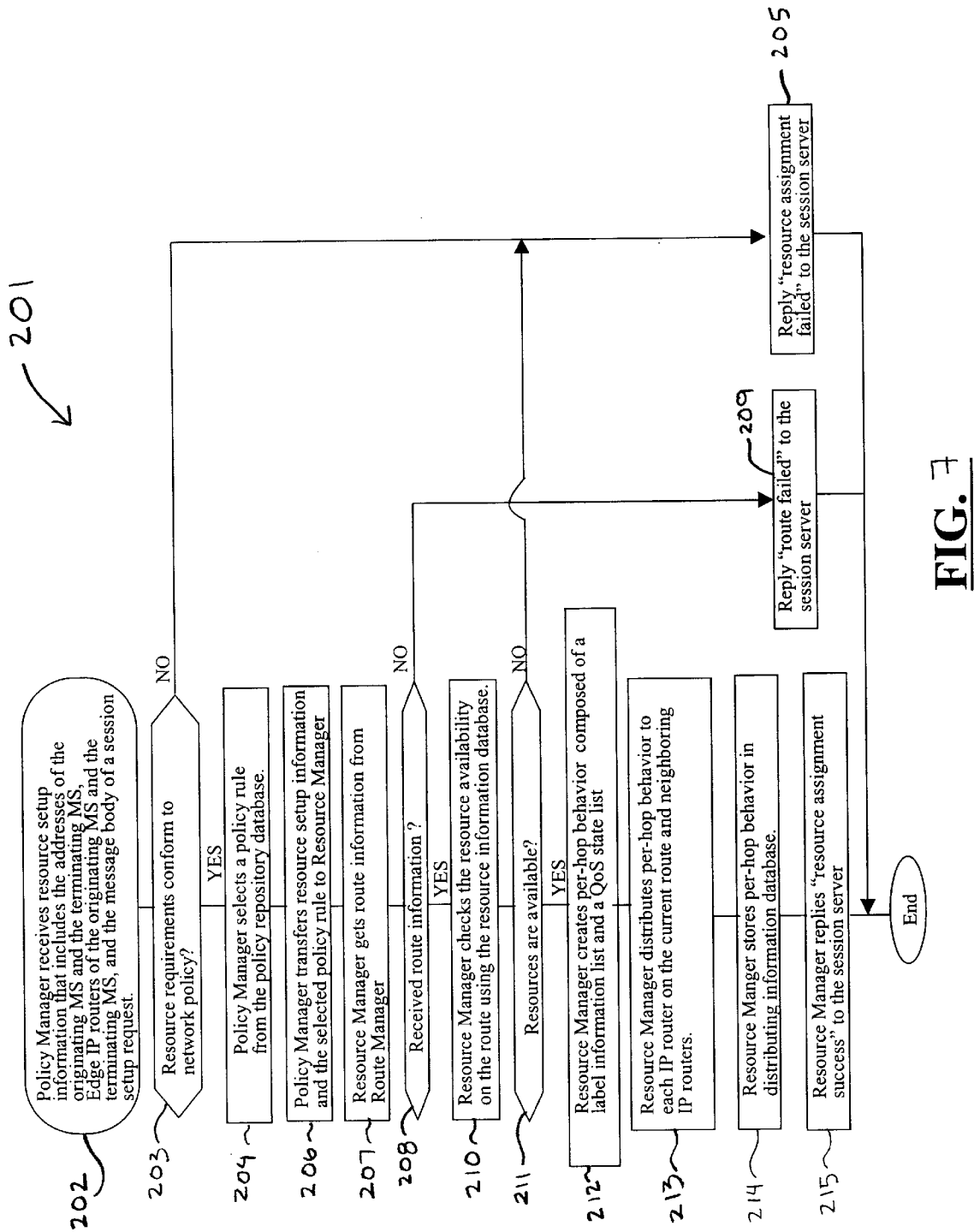
FIG. 7 shows a flow diagram for a resource provisioning procedure in accordance with an embodiment of the present invention.

Resource provisioning procedure 201, which is in accordance with an embodiment of the present invention, is now described with reference to FIG. 7 and FIG. 3. In step 202, policy manager 51 receives resource setup information from session server 37 during the session setup process (see FIG. 6, step 123). The resource setup information includes the Home IP addresses of MS 41 and MS 42 (i.e., the originating and terminating mobile stations, respectively), the care—of addresses of MS 41 and MS 42, IP addresses of edge routers 31A and 31B (i.e., edge routers coupled to the originating and terminating mobile stations), and the message body of the session setup request sent by MS 41 (see FIG. 6, step 113; Table 4).

In step 203, policy manager 51 determines whether the resource requirements of the session such as media type, bandwidth, etc. conform to network policy. If so, policy manager 51 selects the most appropriate policy rule from policy repository database 56 (step 204). Using Table 1 as an example, Rule 1 is selected if the media indicated in the message body of the session setup request initiated by subscriber Hanako is audio. Policy server 36 sends a "resource assignment failure" reply to session server 37 if the resource requirements of the session do not conform to network policy (step 205).

Policy manager 51 sends the resource setup information and the selected policy rule to resource manager 52 (step 206), which then retrieves route information from route manager 53 (step 207). If policy manager 51 does not get a route from route manager 53, a "route failure" reply is sent to session server 37 (steps 208 and 209). Otherwise, resource manager 52 determines the availability of the required resources on the route provided by route manager 53 (step 210).

If the required resources are not available, a "resource assignment failure" reply is sent to session server 37 (steps 211 and 205). Otherwise, resource manager 52 creates an active per-hop behavior (PHB) composed of a label information list 91 and a QoS state list 92 for each router port along the route (steps 211 and 212). Inactive PHB's are also created for router ports near the route. Resource information database 59 is then updated to take into account the resources consumed by the session. By using resource manager 52 to control and keep track of resource usage in mobile core network 30, the Resource Reservation Setup Protocol (RSVP) need not be supported by a mobile station. This advantageously reduces the amount of code that needs to be stored in the mobile station, which may be a small, portable device.

Subsequently, the PHB's are distributed to their respective routers (step 213). In one embodiment, the PHB's are distributed in accordance with the Common Open Policy Service (COPS) protocol. The COPS protocol, in general, is well known; e.g., see the IETF document entitled, "The COPS (Common Open Policy Service) Protocol", RFC 2748.

In step 214, resource manager 52 stores the created PHB's and their distribution information in distributing information database 57. Thereafter, resource manager 52 sends a "resource assignment success" acknowledgement to session server 37 (step 215; see also step 124, FIG. 6).

Figure 8A:
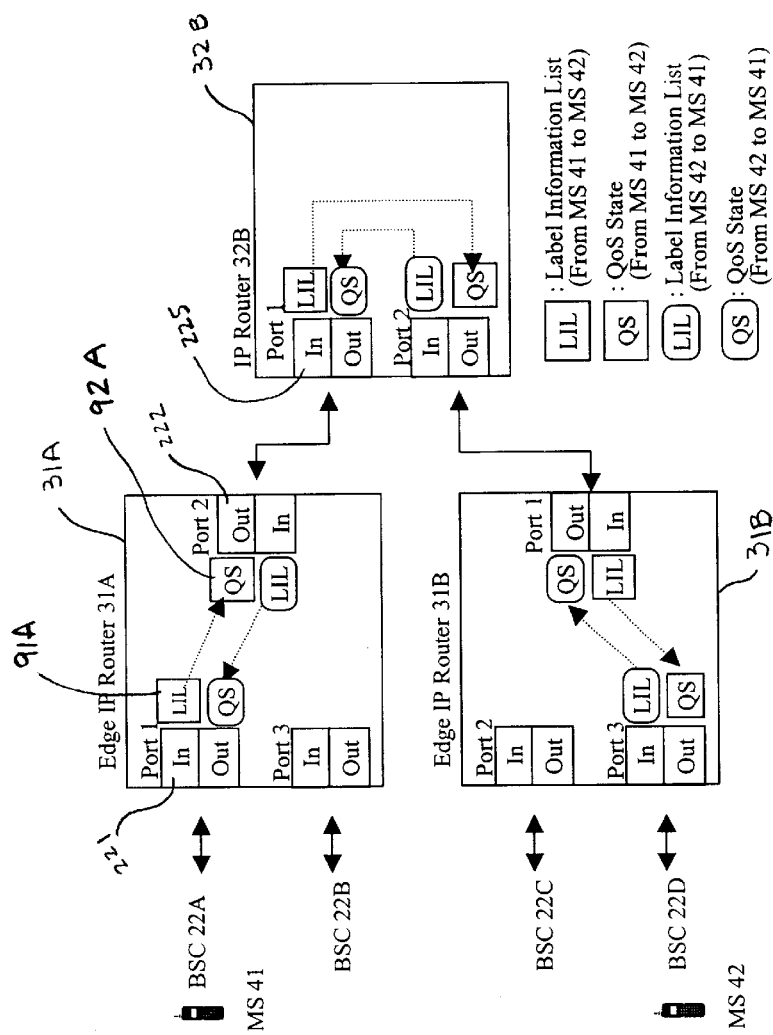
FIGS. 8A and 8B pictorially illustrate the distribution of per-hop behaviors in accordance with an embodiment of the present invention.
Figure 8B:
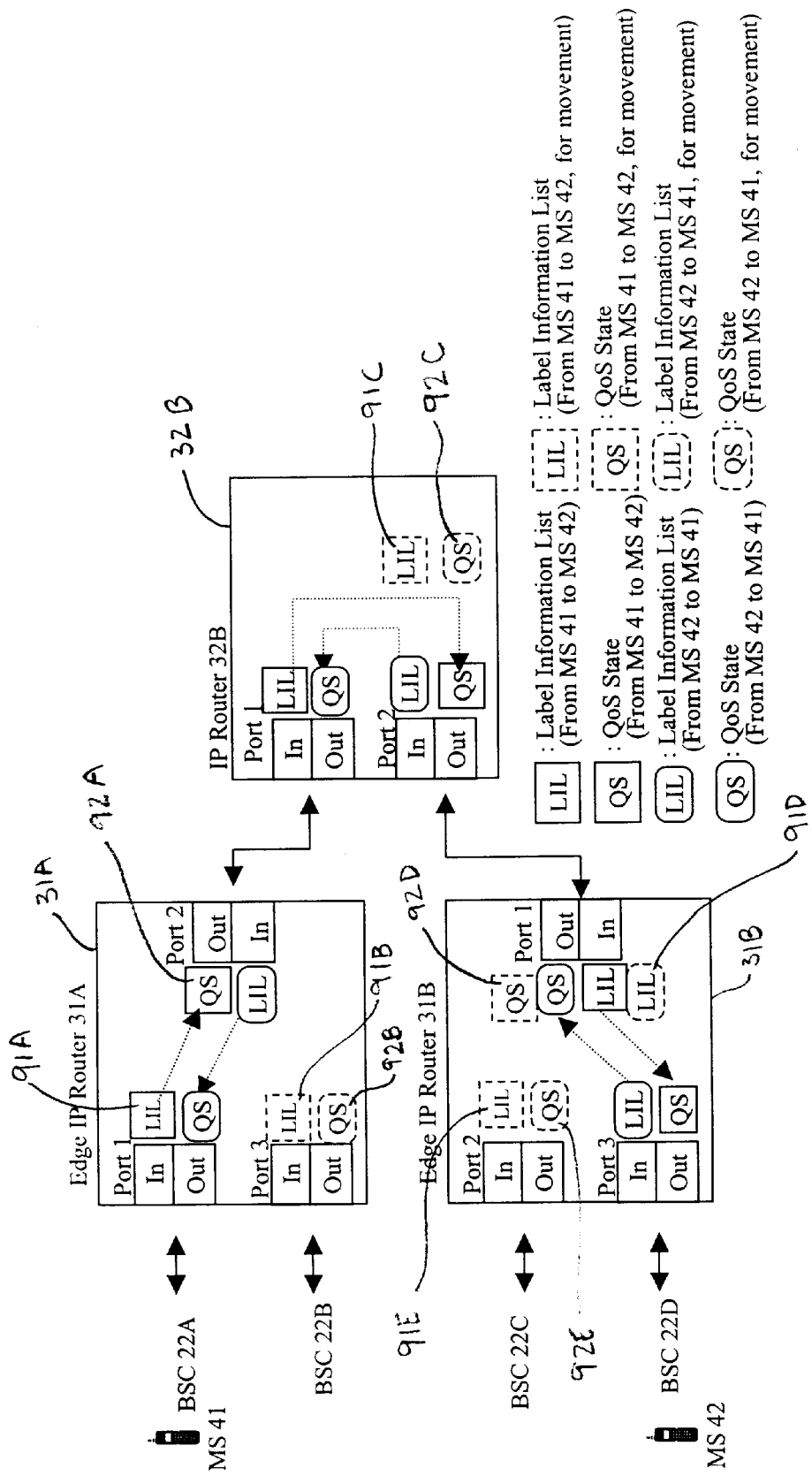

FIGS. 8A and 8B pictorially illustrate the distribution of PHB's in accordance with an embodiment of the present invention. In the example of FIG. 8, PHB's are distributed to ports along a route supporting a session between MS 41 and MS 42. The route goes through port 1 of edge router 31A, port 1 of router 32B, port 2 of router 32B, port 1 of edge router 31B, and port 3 of edge router 31B. Active label information lists (LIL) are provided to each input interface along the route, while active QoS state lists are provided to each output interface along the route. As previously discussed, the label information lists and QoS state lists allow MS 41 and MS 42 to communicate with some guaranteed level of QoS. For example, packets from MS 41 are forwarded from an input interface 221 to an output interface 222 of edge router 31A in accordance with a priority level and forwarding port information indicated in a corresponding active label information list 91A. From output interface 222 of edge router 31A to an input interface 225 of router 32B, the packets are transmitted in accordance with the priority level, sending rules, and discarding rules indicated in a corresponding active QoS state list 92A. The label information lists and QoS state lists along the route are followed until the MS 41 packets are received in base station controller 22D, which is coupled to MS 42.

Inactive PHB's are also distributed to ports near the route (also referred to as "neighboring ports"). In the example of FIG. 8B, inactive label information lists 91B, 91C, 91D, and 91E, and inactive QoS state lists 92B, 92C, 92D, and 92E are distributed to ports near the route. When MS 41 and/or MS 42 move to a new location, such as an adjacent base station controller or edge router, the inactive PHB's on the resulting new route are activated, thereby guaranteeing a level of QoS on the new route. Furthermore, as can be appreciated by persons of ordinary skill in the art, the activation of pre-distributed inactive PHB's is faster than establishing a new route using a conventional protocol such as Mobile IP. Thus, the present invention may be used not only to guarantee a level of QoS for moving mobile stations, but also to minimize the delay associated with changing to a new location.

FIGS. 9A and 9B show an example distributing information for a session between MS 41 and MS 42. The distributing information indicates which label information list and QoS state list get distributed to ports and neighboring ports on the route between MS 41 and MS 42. For example, the distributing information indicates that for packets sent by MS 41 ("distributing information for send"), an active label information list having a behavior ID of 1 is distributed to port 1 of edge router 31A. An inactive label information list having a behavior ID of 1 is also distributed to port 3 and port 2 of edge router 31A to allow for movement of MS 41 or MS 42. As indicated in the distributing information, a QoS state list having a behavior ID of 1 is distributed to port 2 of edge router 31A. The values for behavior ID of 1 are also provided in the distributing information. Note that the home IP addresses of MS 41 and MS 42 are indicated in the top corner portion of the distributing information. The distributing information for each session is stored in distributing information database 57 of policy server 36.

Figure 10:
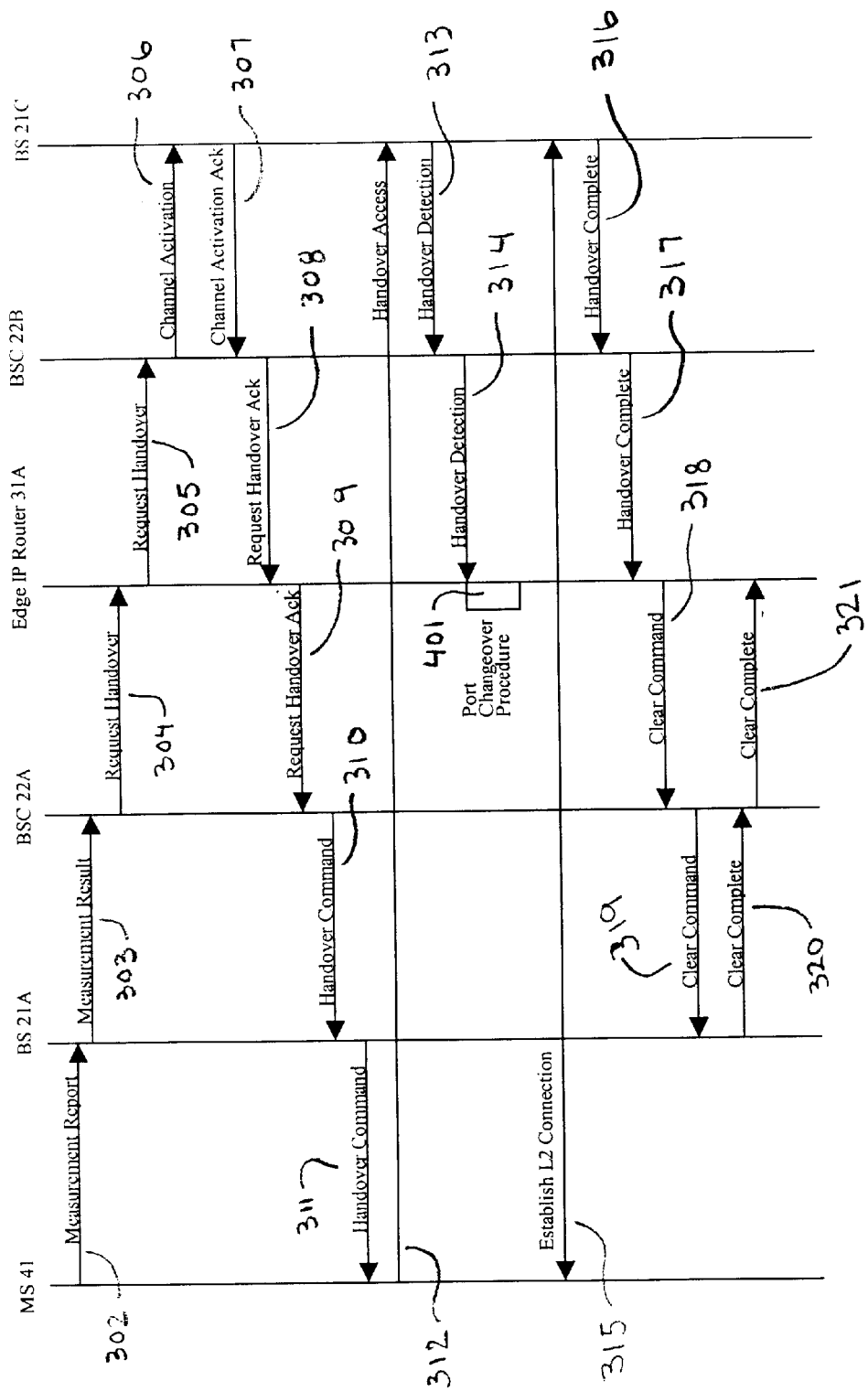
FIG. 10 shows a flow diagram for a handover in accordance with an embodiment of the present invention.

The movement of a mobile station from one base station controller to another within the same edge router is known as a "handover". In an embodiment of the invention, a handover is accomplished by activating the inactive PHB's on the new ports of the new route, and redirecting the forwarding port number of the affected PHB's to the new ports. FIG. 10 shows an example flow diagram illustrating the movement of MS 41 from cell 23A to cell 23C (i.e., handover from BSC 22A to BSC 22B of edge router 31A shown in FIG. 1). In step 302, MS 41 provides base station (BS) 21A a measurement report of the strength of transmission signals between MS 41 and BS 21A. The measurement report is relayed by BS 21A to base station controller (BSC) 22A (step 303). Based on the measurement report, BSC 22A determines that MS 41 moved to a new location and accordingly requests a handover to another base station controller, which is BSC 22B in this example. The handover request is routed from BSC 22A to BSC 22B via edge router 31A (steps 304 and 305). BSC 22B then instructs BS 21C to activate a communications channel to MS 41 now in cell 23C (step 306). BS 21C acknowledges the channel activation request from BSC 22B (step 307), which in turn acknowledges the handover request from BSC 22A via edge router 31A (steps 308 and 309). Accordingly, BSC 22A sends a handover command to MS 41 via BS 21A (steps 310 and 311).

After receiving the handover command, MS 41 proceeds to access BS 21C (step 312). BS 21C detects MS 41 and proceeds to inform edge router 31A (steps 313 and 314), where a port changeover procedure 401 is performed. Port changeover procedure 401, which is further discussed with reference to FIG. 11, changes the forwarding information on the PHB's along the new route to point to the port coupled to the new base station controller (i.e., BSC 22B). Subsequently, a layer 2 connection is established between MS 41 and BS 21C (step 315). BS 21C then sends a handover complete message to edge router 31A via BSC 22B (steps 316 and 317). In response, edge router 31 sends a clear command to BS 21A to inform it that MS 41 has been "handed over" to BS 21C (steps 318 and 319). BS 21A then removes MS 41 from its list of supported mobile stations and so informs edge router 31A (steps 320 and 321).

Figure 11:
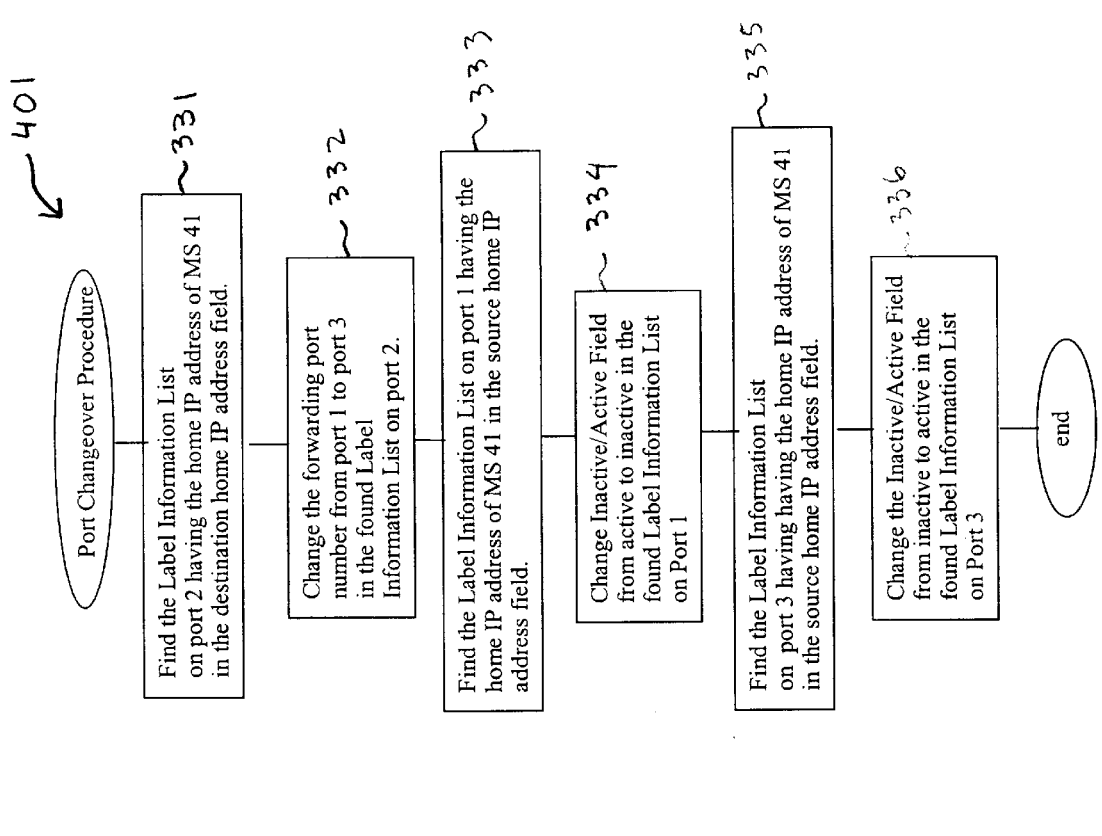
FIG. 11 shows a flow diagram for a port changeover procedure in accordance with an embodiment of the present invention.

In one embodiment, a port changeover procedure to effectuate a handover from one base station controller to another within the same edge router includes the steps of (a) redirecting the forwarding port numbers in the affected PHB's along the new route to point to the new ports, (b) deactivating active PHB's that are no longer required because of the move, and (c) activating inactive PHB's on the new route. FIG. 11 shows a flow diagram for a port changeover procedure 401 in the example where MS 41 moves from cell 23A to cell 23C. The flow diagram of FIG. 11 is with reference to mobile network 10 shown in FIG. 1, distributing information shown in FIGS. 9A and 9B, and PHB distribution diagram shown in FIG. 8B. Turning now to FIG. 11, edge router 31A finds the label information list on port 2 having the home IP address of MS 41 in the destination home IP address field (behavior ID of 4; see FIG. 9A, distributing information for receive, edge router 31A) (step 331). In the found label information list, the forwarding port number is changed from port 1 to port 3 (step 332), thereby redirecting MS 41's incoming traffic to it's new location.

In step 333, the label information list on port 1 of edge router 31A having the home IP address of MS 41 in the source home IP address field is found (behavior ID of 1). Because it is no longer required, the just found label information list on port 1 is deactivated (step 334).

In step 335, the label information list on port 3 having the home IP address of MS 41 in the source home IP address field (behavior ID of 1) is found and activated (step 336), completing the port changeover procedure. Distributing information database 57 is updated to reflect the new distributing information.

Figure 12:
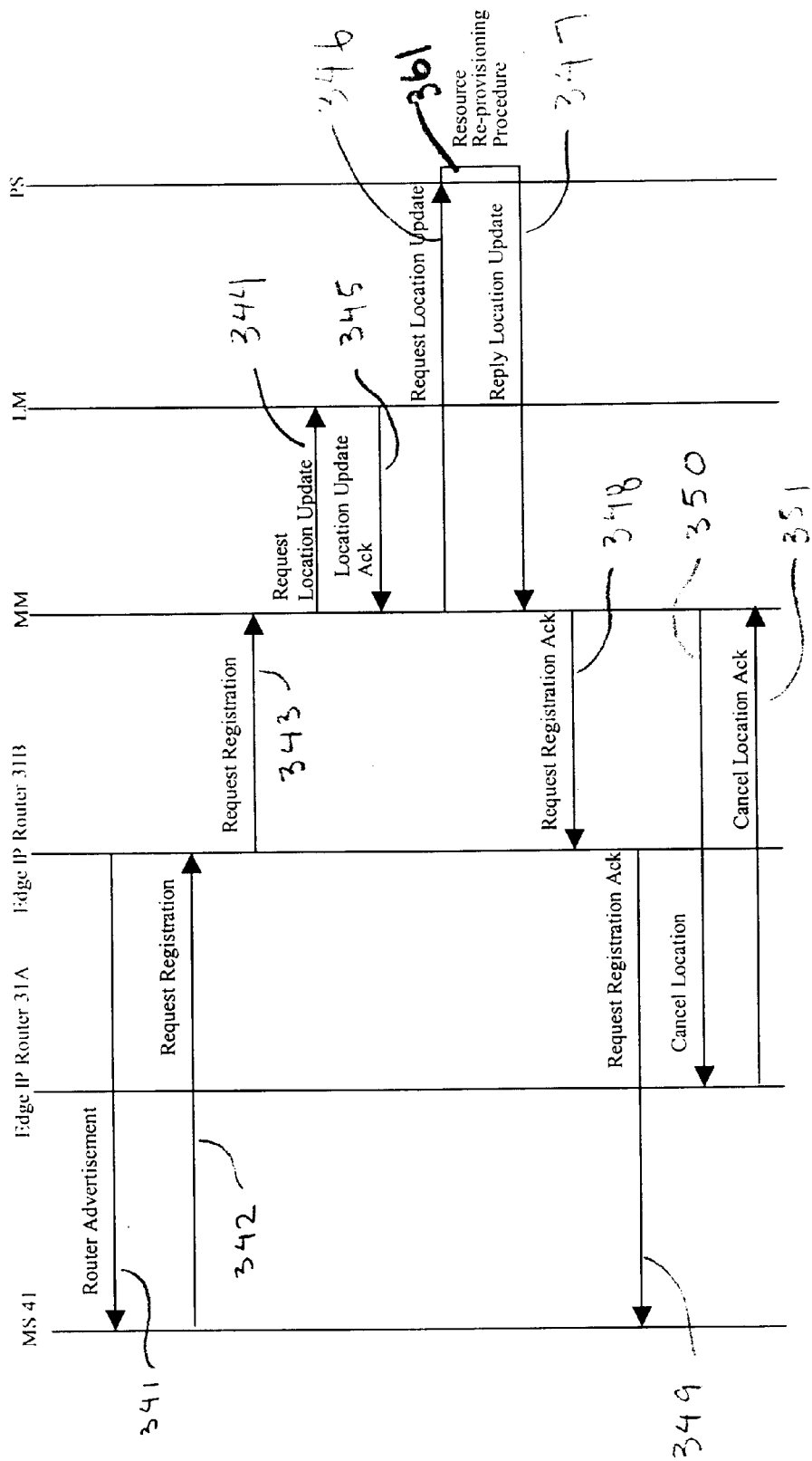
FIG. 12 shows a flow diagram for a macro mobility procedure in accordance with an embodiment of the present invention.

The movement of a mobile station from one edge router to another is referred to as macro-mobility. FIG. 12 shows an example flow diagram illustrating the movement of MS 41 from a cell coupled to edge router 31A to another cell coupled to edge router 31B. In step 341, MS 41 receives a router advertisement from edge router 31B in the new cell. From the advertisement, MS 41 determines that it is now coupled to a new edge router and accordingly sends a registration request to mobility manager 34 via edge router 31B (steps 342 and 343). In response, mobility manager 34 informs location manager 35 that MS 41 has moved to a new location (step 344). Location manager 35 updates MS 41's location information and sends an acknowledgement to mobility manager 34 (step 345). Mobility manager 34 also informs policy server 36 of MS 41's new location (step 346).

Unlike a handover procedure, a macro mobility procedure involves the addition of routers on the new route and/or the deletion of routers on the old route. Thus, resources along the new and old routes are re-provisioned (i.e., re-allocated) during a macro mobility procedure to guarantee a level of QoS. Referring back to step 346 of FIG. 12, policy server 36 performs a resource re-provisioning procedure 361 upon learning of MS 41's movement to another edge router. Once resources on the old and new routes are re-provisioned, policy server 36 sends a reply to mobility manager 34 (step 347). Accordingly, mobility manager 34 acknowledges the registration request initiated by MS 41 (steps 348 and 349). Mobility manager 34 then instructs edge router 31A to cancel MS 41 from its list of supported mobile stations (steps 350). After canceling MS 41, edge router 31A sends an acknowledgement to edge router 31A (step 351).

Figure 13:
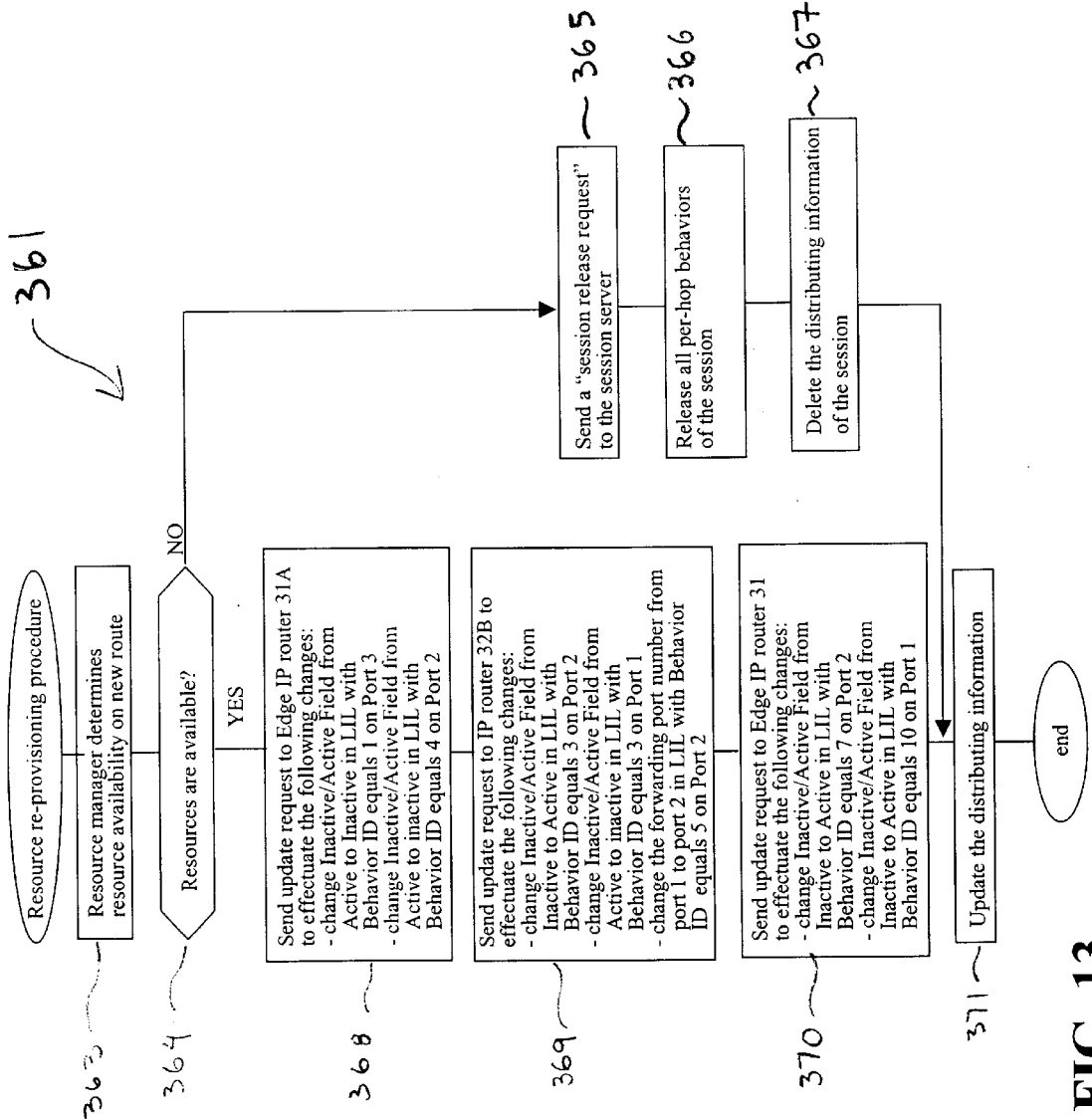
FIG. 13 shows a flow diagram for a resource re-provisioning procedure in accordance with an embodiment of the present invention.

In one embodiment, a resource re-provisioning procedure in support of macro mobility includes the steps of (a) determining whether resources are available on the new route and if so, (b) activating inactive PHB's on the new route, (c) deactivating active PHB's that are no longer required because of the movement, and (d) redirecting the forwarding port numbers in the affected PHB's along the new route to point to the new ports. FIG. 13 shows a flow diagram for a resource re-provisioning procedure 361 in the example where MS 41 moves from a cell coupled to edge router 31A to another cell coupled to edge router 31B. The flow diagram of FIG. 13 is described with reference to mobile network 10 shown in FIG. 1, policy server 36 shown in FIG. 3, distributing information shown in FIGS. 9A and 9B, and PHB distribution diagram shown in FIG. 8B. Turning now to FIG. 13, procedure 361 starts with resource manager 52 determining whether the resources required by the session are available on the new route (steps 363 and 364). If not, policy server 36 sends a session release request to session server 37 to terminate the session (step 365), releases all PHB's of the session (step 366), and deletes the distributing information of the session (step 367). Otherwise, policy server 36 sends an update request to deactivate all PHB's of the session in edge router 31A (step 368). The following are performed in edge router 31A in step 368:

(a) deactivate the label information list having a behavior ID of 1 on port 3; and (b) deactivate the label information list having a behavior ID of 4 on port 2.

In step 369, policy server 36 sends an update request to router 32B to activate the PHB's on the new route, deactivating the PHB's on the old route, and redirecting MS 41's incoming traffic to a port coupled to its new edge router. The following are performed in router 32B in step 369:

(a) activate the label information list having a behavior ID of 3 on port 2;

(b) deactivate the label information list having a behavior ID of 3 on port 1; and (c) changing the forwarding port number in the label information list having a behavior ID of 5 from port 1 to port 2, thereby redirecting MS 41's incoming traffic to its new port in edge router 31B.

In step 370, policy server 36 sends an update request to edge router 31B to activate the PHB's on the new route. The following are performed in edge router 31B in step 370:

(a) activate the label information list having a behavior ID of 7 on port 2 to allow MS 41 to send traffic from port 2; and (b) activate the label information list having a behavior ID of 10 on port 1 to allow MS 41 to receive incoming traffic on port 2.

In step 371, the distributing information for the session is updated to reflect the changes made during the resource re-provisioning procedure.

Figure 14:
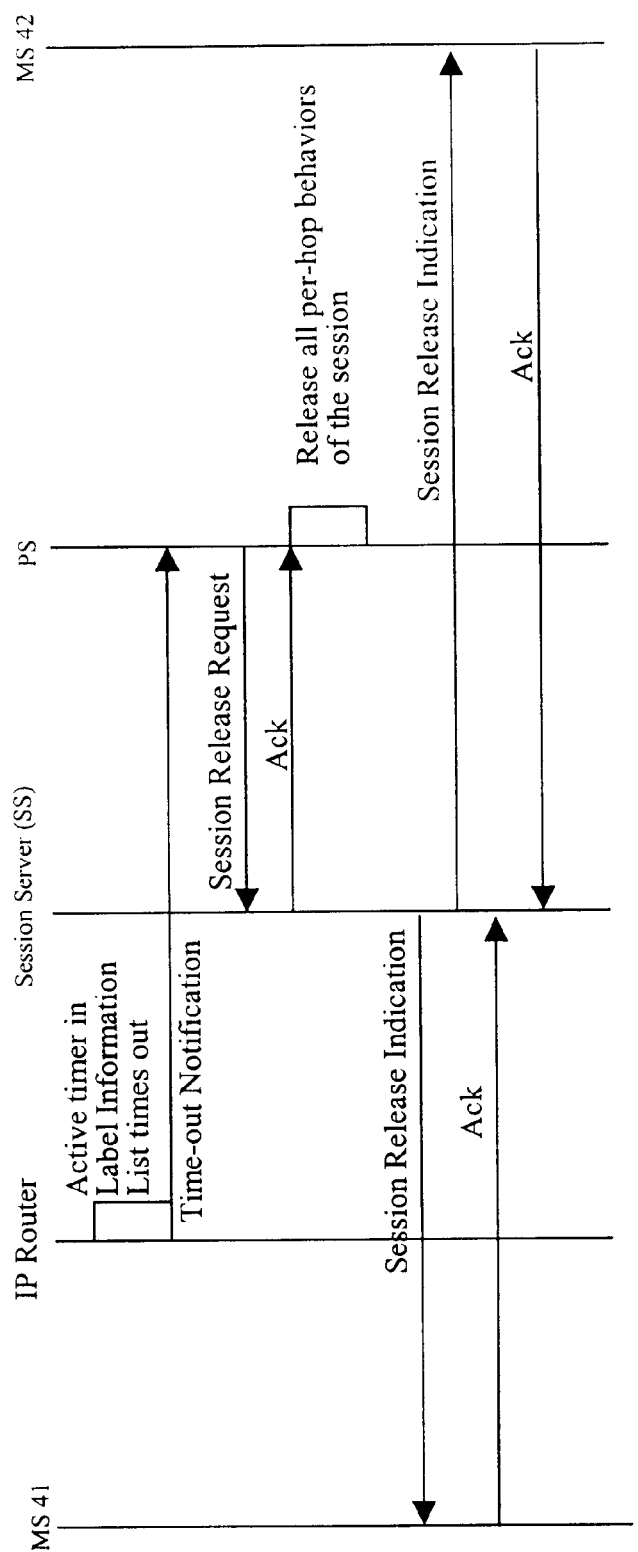
FIGS. 14 and 15 show flow diagrams for releasing a session in accordance with an embodiment of the present invention.
Figure 15:
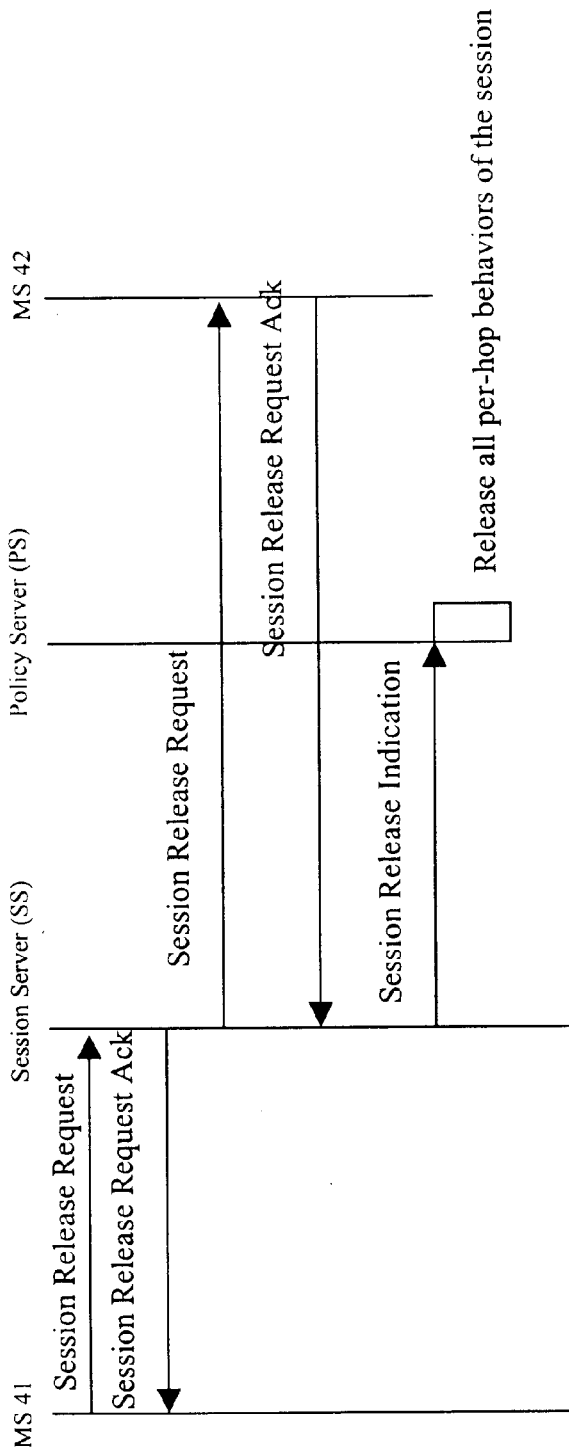

FIGS. 14 and 15 show flow diagrams for releasing a session in one embodiment of the invention. In FIG. 14, a session release is initiated by a router when an active timer field in a label information list decrements to zero (i.e., times out). This occurs, for example, when the label information list has not been accessed for a period of time indicating that the session is no longer in use. In that case, the router sends a time-out notification to policy server 36, which then initiates the release of the session. As shown in FIG. 15, the session may also be released by a mobile station by sending a session release request to session server 37, which then relays the session release request to policy server 36 and the other mobile station.

A method and associated system for establishing a session with a level of QoS in a mobile network have been disclosed. While specific embodiments have been provided, it is to be understood that these embodiments are for illustration purposes and not limiting. Many additional embodiments will be apparent to persons of ordinary skill in the art reading this disclosure. Thus, the present invention is limited only by the following claims.

What is claimed is:

1. A method for establishing a session in a mobile network comprising:

finding a route;

determining the availability of resources along the route;

distributing active per-hop behaviors to ports along the route;

distributing inactive per-hop behaviors to ports near the route; and transporting data on the route in accordance with the active per-hop behaviors.

2. The method of claim 1 wherein the route leads to a wireless device.

3. The method of claim 1 wherein the mobile network includes a radio access network.

4. The method of claim 1 wherein the mobile network includes an Internet Protocol (IP) mobile core network.

5. The method of claim 1 wherein each of the active and inactive per-hop behaviors indicates a priority level.

6. The method of claim 1 wherein each of the active and inactive per-hop behaviors includes forwarding port information.

7. The method of claim 1 wherein each of the active and inactive per-hop behaviors includes a rule for discarding packets.

8. The method of claim 1 wherein each of the active and inactive per-hop behaviors includes a rule for sending packets.

9. The method of claim 1 wherein the session is a multimedia session.

10. The method of claim 1 wherein each of the active and inactive per-hop behaviors includes a timer.

11. A mobile network compromising:

a mobile station;

a radio access network coupled to the mobile station; and a mobile core network comprising:

an edge router coupled to the radio access network;

an interior router coupled to the edge router;

a session server for establishing a session in the mobile core network;

a mobility manager for keeping track of the movement of the mobile station; and a policy server for allocating and keeping track of resources in the mobile core network, the policy server also including a distributing information database containing information on how active and inactive per-hop behaviors are distributed in the mobile network.

12. The mobile network of claim 11 wherein the mobile station is a cellular phone.

13. The mobile network of claim 11 wherein the edge router and interior router support the Multiprotocol Label Switching (MPLS) protocol.

14. The mobile network of claim 11 wherein the mobile core network is an Internet Protocol (IP) Network.

15. The mobile network of claim 11 wherein the mobile core network further includes a gateway.

16. The mobile network of claim 15 wherein the gateway is coupled to the Internet.

17. A method for moving a mobile station comprising:
moving a mobile station from an old route to a new route;
activating inactive per-hop behaviors on ports along the new route;
deactivating active per-hop behaviors on the old route that are no longer required on the new route;
redirecting traffic from the old route to the new route; and
commencing traffic on the new route.

18. The method of claim 17 further comprising:
determining the availability of resources on the new route prior to commencing traffic.

19. The method of claim 17 wherein the mobile station includes a cellular phone.

20. The method of claim 17 wherein the route leads to the Internet.

* * * * *